United States Patent [19]

Hageman et al.

[11] Patent Number: 6,082,831
[45] Date of Patent: Jul. 4, 2000

[54] ELECTRO-HYDRAULIC BRAKE APPLY SYSTEM DISPLACEMENT AUGMENTATION

[75] Inventors: John Benjamin Hageman, Vandalia; Ernst Severin Baumgartner, Dayton; Donald Edward Schenk, Vandalia, all of Ohio

[73] Assignee: General Motors Corporation, Detroit, Mich.

[21] Appl. No.: 09/064,337

[22] Filed: Apr. 22, 1998

[51] Int. Cl.[7] .............................. B60T 8/42; B60T 8/36; B60T 11/08; F15B 7/04

[52] U.S. Cl. ................. 303/115.2; 60/578; 303/119.2

[58] Field of Search ............. 60/578; 303/DIG. 1, 303/DIG. 2, 119.2, 119.3, 115.2, 115.4, 115.5, 116.1, 116.4, 162

[56] References Cited

U.S. PATENT DOCUMENTS

| | | | |
|---|---|---|---|
| 2,291,056 | 7/1942 | Pallady | 60/578 |
| 2,928,245 | 3/1960 | Sjodin | 60/578 |
| 4,732,001 | 3/1988 | Belart | 60/578 |
| 5,000,523 | 3/1991 | Mikhaeil-Boules et al. | 303/115 |
| 5,557,935 | 9/1996 | Ganzel | 60/578 |

*Primary Examiner*—Robert J. Oberleitner
*Assistant Examiner*—Jeffrey Woller
*Attorney, Agent, or Firm*—Robert M. Sigler

[57] ABSTRACT

A brake apply system includes a modulator that has a first bore carrying a power driven dual-effect piston. The piston has a base piston surface and an augmentation piston surface. A wheel brake is hydraulically connected to the modulator through an open fluid communication route that is provided between the wheel brake and the base piston surface. A selectively open fluid communication route is provided between the wheel brake and the augmentation piston surface with a check valve mechanism positioned in the selectively open fluid communication route. An augmentation chamber is defined adjacent the augmentation surface of the dual-effect piston. The modulator includes a second bore carrying a valve mechanism that provides an open flow path between the augmentation chamber and a reservoir when pressure at the wheel brake is relatively high and that significantly restricts the flow path when the wheel brake pressure is relatively low. Through this mechanism the augmentation surface is added to the base piston surface for a dual-effect pressure generation area that increases the initial pressurization rate of the brake apply system. Advantageously, the faster the apply rate of the braking system, the greater the augmentation pressure and displacement that is available.

7 Claims, 3 Drawing Sheets

6,082,831

ELECTRO-HYDRAULIC BRAKE APPLY SYSTEM DISPLACEMENT AUGMENTATION

TECHNICAL FIELD

The present invention relates to an electro-hydraulic brake apply system with displacement augmentation and more particularly, to an electro-hydraulic brake apply system with a modulator that effects hydraulic fluid flow augmentation under certain brake application conditions.

BACKGROUND OF THE INVENTION

A typical vehicle braking system includes a master cylinder with a power booster that intensifies a manual input force and applies it to the master cylinder to effect pressurization of an associated braking system. Within the master cylinder selective movement of primary and secondary pistons develops elevated fluid pressure which is transmitted to the braking system. During base brake operation, the primary and secondary pistons generate operating fluid pressure which is used to actuate brake calipers or wheel cylinders at each vehicle wheel brake.

Electro-hydraulic brake apply systems are also known wherein the pressure applied to a vehicle's wheel brakes is controlled by a electronic unit that evaluates several parameters and delivers a control signal to a hydraulic modulator that sets the wheel brake pressure. A key parameter used to determine the appropriate braking pressure at the wheel brake is the driver's command, delivered as an input on the brake pedal. Generally, a pressure sensor or brake pedal force sensor monitors apply action providing feedback to the control system for use in setting the braking pressure.

A typical hydraulic modulator includes a pressure generation mechanism and a means of controlling delivery of the generated pressure to the wheel brakes. This may take the form of a pump and proportional hydraulic valve, a pump with a pair of two way valves or a movable piston variable pressure chamber device. The number and arrangement of these elements included in a braking system is determined by the system layout and selected control scheme. With a movable piston variable chamber device, a piston is driven linearly in a bore to vary the size of a pressure chamber. The pressure chamber is connected to a brake line leading to the wheel brake. For an application of braking pressure, the size of the variable chamber is reduced to take up compliance in the system, and to increase braking pressure. The piston applies an increased force to the contained non-compressible fluid to apply the brake. To decrease braking pressure, the force on the piston is reduced and when appropriate, the size of the variable chamber is increased to release the brake.

An automotive braking system may operate without a booster under electrical or electro-hydraulic control in the traditional base brake mode wherein manual actuation of the master cylinder effects a desired application of the wheel brakes with assistance from a remote pressure modulator. In addition to the base brake mode of operation, braking systems are often capable of controlling vehicle deceleration through anti-lock operation, controlling vehicle acceleration through traction control operation, and improving lateral and longitudinal vehicle stability through stability enhancement systems which provide a level of dynamic handling augmentation. During operation of a braking system in a brake-by-wire type of control, the typical master cylinder is isolated from the remainder of the braking system and power is effected through an ancillary pressure generation mechanism such as a motor driven pump or pressure chamber/piston arrangement. In order to effect a fast response time, a relatively large motor and pump combination or a large piston is typically required. Another known method of providing a fast cycle response time is to utilize a separate high pressure accumulator to store a fluid pre-charge, which can be applied to the vehicle wheel brakes when required. These approaches are somewhat undesirable since they tend to increase the overall costs of the system.

SUMMARY OF THE INVENTION

A brake apply system according to an aspect of the present invention includes a modulator that has a first bore carrying a power driven dual-effect piston. The piston has a base piston surface and an augmentation piston surface. A wheel brake is hydraulically connected to the modulator through an open fluid communication route that is provided between the wheel brake and the base piston surface. A selectively open fluid communication route is provided between the wheel brake and the augmentation piston surface with a check valve mechanism positioned in the selectively open fluid communication route. Preferably, a fluid reservoir is hydraulically connected to the modulator. An augmentation chamber is defined adjacent the augmentation surface of the dual effect piston. The modulator includes a second bore carrying a valve mechanism that provides an open flow path between the augmentation chamber and the reservoir when pressure at the wheel brake is relatively high, and that significantly reduces the flow path through a fixed orifice when the wheel brake pressure is relatively low. Through this mechanism the augmentation surface is added to the base piston surface for a dual-effect pressure generation area that increases the initial pressurization rate of the brake apply system. For example, greater fluid displacement is provided during the initial 100–150 psi pressure build during brake apply, which corresponds with the highest compliance portion of the pressure versus displacement performance curve of a caliper based braking system. Since there is a fixed orifice flow through the augmentation valve mechanism, the faster the rate of apply of the power driven piston, the greater the pressure rise in the augmentation chamber. Therefore, a greater augmentation gain is available for rapid apply situations.

BRIEF DESCRIPTION OF THE DRAWINGS

The present invention will now be described by way of example with reference to the accompanying drawings in which.

DESCRIPTION OF THE PREFERRED EMBODIMENT

Figure 1:
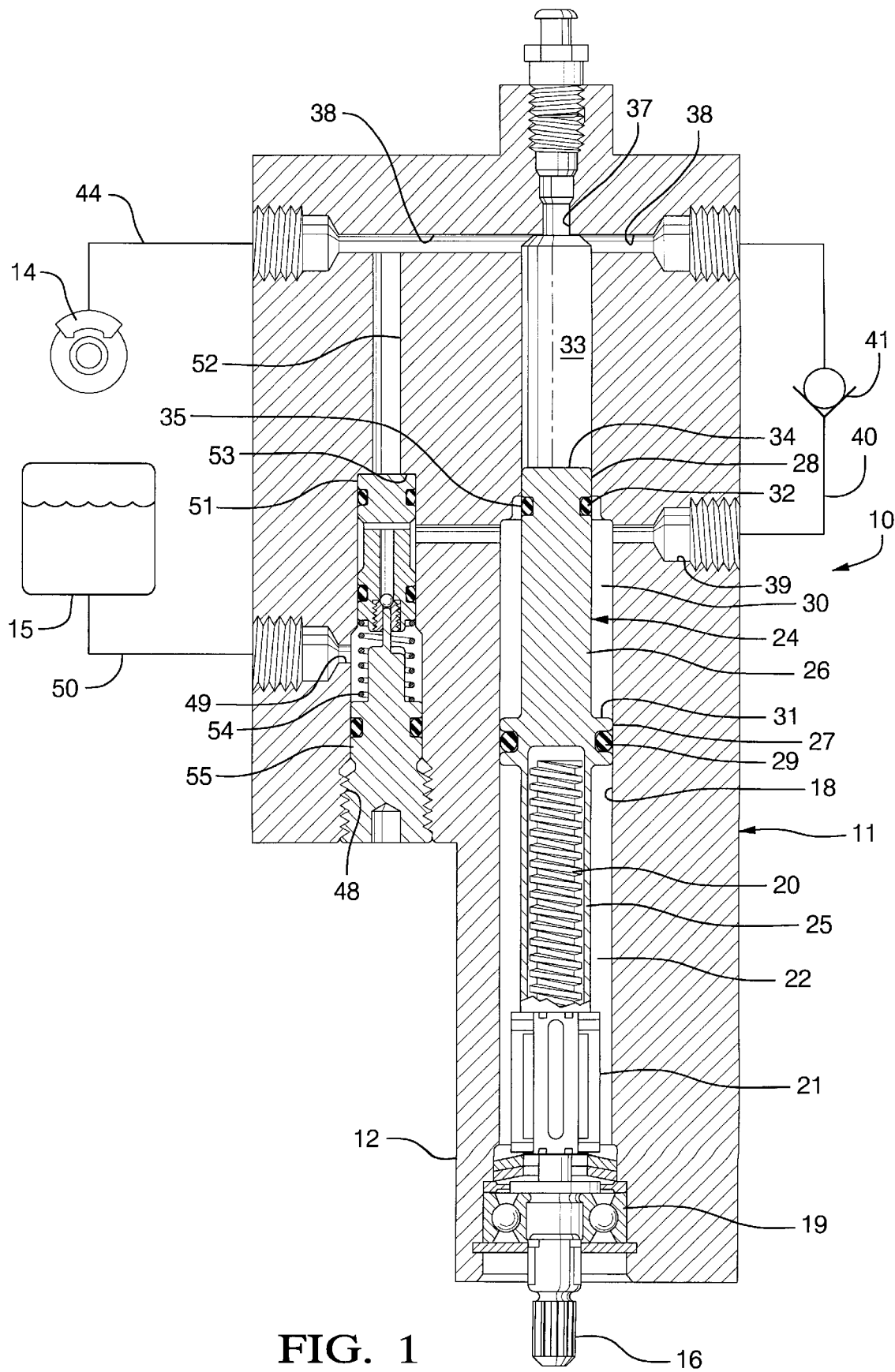
FIG. 1 is a schematic illustration of a vehicle braking system according to the present invention showing the system's modulator in cross section.

Referring to the drawings, a brake apply system is illustrated in FIG. 1 and is designated generally at 10. Brake apply system 10 is of the electro-hydraulic apply type and operates without a power booster between the system's brake pedal and master cylinder assembly. This type of system is disclosed in U.S. Pat. No. 5,246,283 to Shaw, which issued Sep. 21, 1993, and is specifically incorporated herein by reference. The brake apply system 10 includes a modulator 11 that has a body 12 made of an acceptably rigid material such as metal. The modulator 11 is hydraulically connected to a wheel brake 14 and a fluid reservoir 15. In addition, the modulator 11 interfaces with a bi-directional drive system (not illustrated), through the input shaft 16. Through rotation of the input shaft 16, the modulator 11 is functionally capable of applying the wheel brake 14 through the use of a pressure generation mechanism and is capable of releasing the wheel brake 14 by means of effecting fluid flow back to the modulator 11. Fluid compensation (make-up) and discharges from the modulator 11 are communicated from and to the reservoir 15.

Body 12 of modulator 11 includes a main bore 18 that receives the pressure generation mechanism in the form of a ball screw driven piston assembly. The input shaft 16 is supported on body 12 within bore 18 by a bearing assembly 19, and includes a threaded section 20. The threaded section 20 is drivingly engaged with a ball nut assembly 21 that translates within dry chamber 22 of bore 18 through selective rotation of the input shaft 16. A dual-effect piston assembly 24 is engaged with the ball nut 21 and translates within the bore 18 in coordinated movement therewith. Piston assembly 24 includes a tubular section 25 that engages the ball nut assembly 21 and receives the threaded section 20 of input shaft 16. The tubular section 25 is formed as one piece with a body section 26 that includes an annular protruding waistline section 27 and a head section 28. The waistline section 27 includes a groove that carries an annular seal 29 that bears against the wall of bore 18 separating the dry chamber 22 from an augmentation chamber 30. The waistline section 27 also forms annular augmentation piston surface 31, which faces into augmentation chamber 30 and operates as a moving boundary of augmentation pressure chamber 30. The head section 28 similarly includes a groove that carries an annular seal 32 that bears against the wall of bore 18 separating the augmentation pressure chamber 30 from a main pressure chamber 33. The head section 28 also forms a base piston surface 34 facing into main pressure chamber 33 and operating as a moving boundary of main pressure chamber 33. With the modulator 11 in the fully released position shown, a release opening 35 allows fluid communication between the main pressure chamber 33 and the augmentation pressure chamber 30. This allows full release of the pressure at wheel brake 14 to the reservoir 15 when the piston assembly 24 approaches the full release position.

Figure 3:
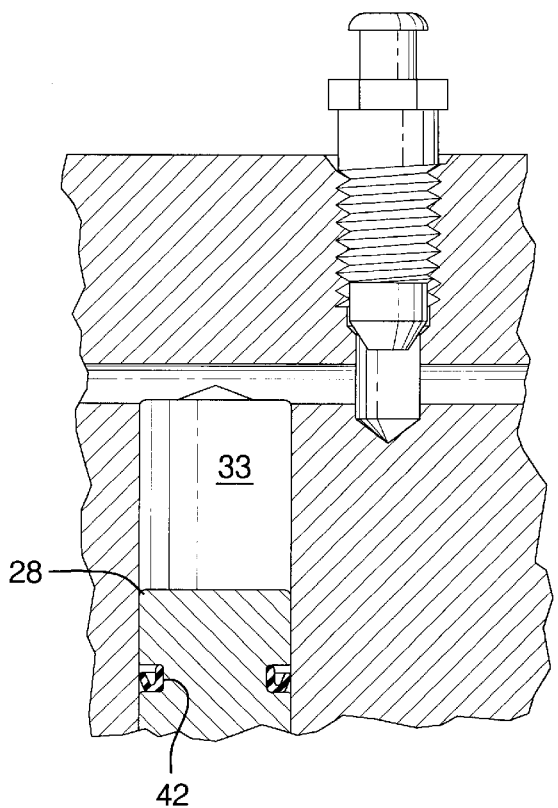
FIG. 3 is a fragmentary cross sectional detail illustration of an alternative feature of the modulator.

The main pressure chamber 33 is open to a bleed valve port 37 and is continuously open to the wheel brake 14 through bore 38. The augmentation pressure chamber is also open to the main pressure chamber through bore 39, conduit 40.and bore 38. The conduit 40 includes a check valve 41 that allows fluid to flow from augmentation pressure chamber 30 to main pressure chamber 33 alongside piston head section 28 of dual effect piston assembly 24, while preventing the flow of fluid from main pressure chamber 33 to augmentation pressure chamber 30 through conduit 40. Optionally, as shown in FIG. 3, the conduit 40 and check valve 41 can be replaced by an annular lip seal 42 used on the piston head 28 in place of annular seal 32. The lip seal 42 flexes to allow fluid to flow into main pressure chamber 33 from augmentation pressure chamber 30 while preventing fluid flow in the opposite direction.

With the modulator 11 as thus far described, rotation of the input shaft 16 causes linear translation of the ball nut 21 and the piston assembly 24 within bore 18. As this occurs, the release opening 35 is closed, and the fluid within main pressure chamber 33 and augmentation pressure chamber 30 is displaced. The fluid from main pressure chamber 33 moves through bore 38 and conduit 44 to wheel brake 14. The fluid from augmentation pressure chamber 30 moves through bore 39, conduit 40, check valve 41, bore 38 and conduit 44 to wheel brake 14. Through this mechanism the maximum-effective augmentation piston area is equal to the sum of base piston surface 34 and augmentation piston surface 31, (or an equivalent piston area resulting from the diameter of the waistline section 27), which is significantly larger than the head section 28 by itself. However, with this enlarged area, a significantly higher torque is required to drive the system through the input shaft 16 to generate a given pressure than would be required if only the area of base piston surface 34 is used to generate pressure. Accordingly, the apply system 10 includes a cut-off mechanism to drop the augmentation piston area 31 out of the pressure generation mechanism when pressures begin to significantly increase. This permits the generation of maximum braking pressures approaching 2000 psi with an acceptable level of input torque, while providing higher fluid displacements rates when most need to overcome system compliance at lower pressures.

Figure 2:
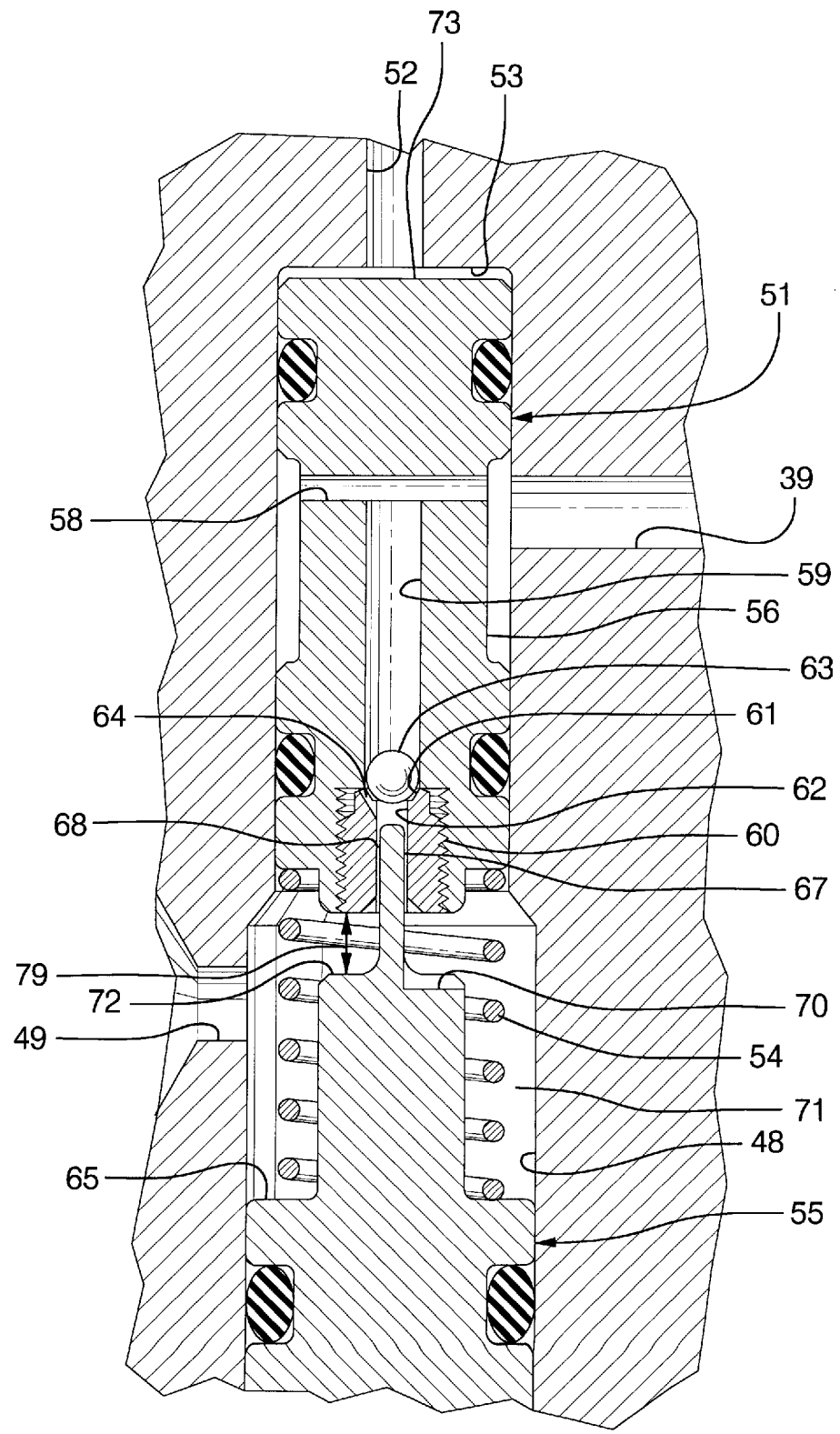
FIG. 2 is a fragmentary cross sectional detail illustration of a part of the modulator shown in FIG. 1.

The cut-off mechanism includes a bore 48 that is formed in body 12 alongside bore 18. The bore 48 intersects bore 38 through reduced diameter section 52, bore 39 and a bore 49 that opens to the reservoir 15 through conduit 50. A valve obturator in the form of shuttle 51 is carried in bore 48 and is biased toward step 53 by a spring 54 that is grounded against a stop 55 that is fixed in the bore 48. Referring to FIG. 2, the shuttle 51 is generally provided as a spool shaped member with a pair of lands separated by an undercut 56. Each land carries a seal that bears against the wall of bore 48 providing fluid separation at the undercut 56 as the shuttle moves within the bore 48. A cross bore 58 extends through the shuttle 51 at the undercut 56 and a longitudinal bore 59 extends into the shuttle 51 and registers with the cross bore 58. The longitudinal bore 59 threadedly receives a tubular insert 60 that includes a valve seat 61 formed at the end of central opening 62. A ball 63 is trapped in the longitudinal bore 59 by insert 60 and engages the valve seat 61 substantially closing off flow from the bore 49. A slot 64 is formed in the insert 60 at the valve seat 61 providing a continuously open orifice bypass around the ball 63. In addition to providing a surface 65 to support the spring 54, the stop 55 includes a pin 67 that extends into the central opening 62 with clearance 68 for fluid flow. Stop 55 has a groove 70 that provides an opening between the chamber 71 and the central opening 62 when the shuttle 51 is forced against the face 72 of stop 55. Stop 55 also includes a groove carrying an annular seal that closes the chamber 71.

Fluid flow control provided through the shuttle 51 and spring 54 establishes the augmentation cut-off point based on the pressure level provided to the wheel brake 14. Referring again to FIG. 1 in conjunction with FIG. 2, when the input shaft 16 is rotated to compress the main pressure chamber 33 and the augmentation pressure chamber 30, fluid pressure increases at wheel brake 14. The pressure increase is initially due to fluid being displaced by both the base piston surface 34 and the augmentation piston surface 31. Some of the fluid displaced by augmentation piston surface 31 travels through bore 39 to bore 48. At bore 48, with the shuttle 51 in an augmentation position, fluid enters the area of undercut 56 and moves into cross bore 58. From cross bore 58, fluid moves through longitudinal bore 59, slot 64, central opening 62 and chamber 71 to bore 49 for transmission to the reservoir 15. This controlled flow through the slot 64 acts to make augmentation pressure build up dependent upon flow rate. The result is that significant augmentation is provided at fast apply rates and little, or no augmentation is provided during slow apply rates. During the apply action, the pressure building in the bore 38 acts against the face 73 of shuttle 51 through the section 52 of bore 48. The force resulting from the pressure acting on face 73 is opposed by the spring 54, which has a rate selected for the application. When a predetermined pressure level is reached, the shuttle 51 moves to compress the spring 54 and the pin 67 moves further into central opening 62 until the ball 63 is unseated by the pin 67. This results in free-flow from the bore 39 to the bore 49 through the valve seat 61, cutting-off augmentation and discharging the fluid displaced from augmentation chamber 30 to the reservoir 15. The check valve 41 prevents the escape of the fluid displaced from main pressure chamber 33. The at-rest gap 79 between the face 72 and the base of shuttle 51 is tightly controlled so that minimal displacement loss occurs when the shuttle 51 moves to unseat the ball 63. In the present embodiment the gap 79 is approximately 0.35 millimeters.

During a rapid release, when the input shaft 16 rotates in the opposite direction to expand the main pressure chamber 33 and the augmentation pressure chamber 30, a partial vacuum is developed in the augmentation pressure chamber 30. As a result, even though the shuttle 51 is moved so that the ball 63 is disengaged from the pin 67, the ball 63 lifts off the valve seat 61. This allows rapid back flow from the reservoir 15 and into the augmentation pressure chamber 30. Optionally, a small spring force may be applied to the ball 63 to ensure its return onto the valve seat 61 when the modulator 11 returns to an at-rest condition.

Figure 4:
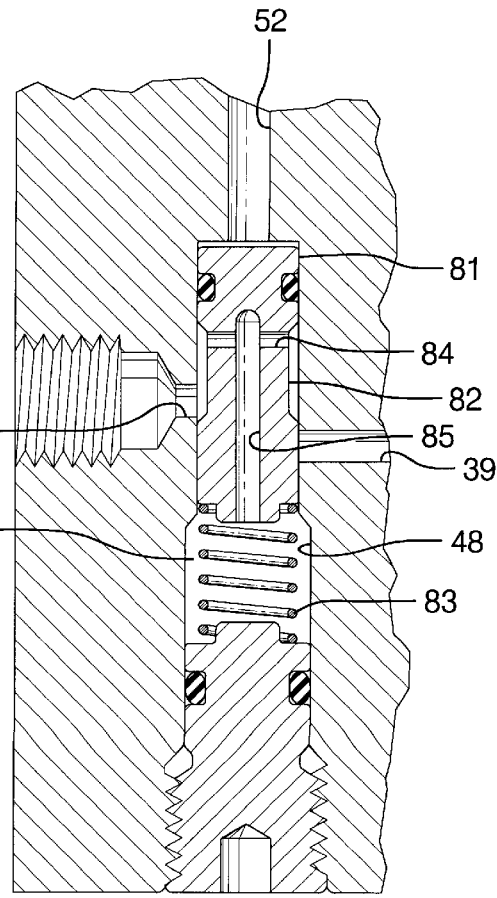
FIG. 4 is a fragmentary cross sectional detail illustration of an alternative feature of the modulator.

Referring to FIG. 4, an alternative embodiment of the cut-off mechanism is illustrated. In this arrangement, the shuttle does not include an internal valve to control flow through the bore 48 between the bores 39 and 49. Instead, the shuttle 81 itself operates to obstruct flow. As shown, in an augmentation state, the shuttle 81 is positioned to close the bore 39 off from the undercut 82. A small amount of fluid can move through the slight clearance space between the shuttle 81 and the wall of bore 48. During an apply, when the fluid pressure in bore section 52 overcomes the force of spring 83, the shuttle will move to open the bore 39 to the bore 49 through the cross bore 84, cutting-off augmentation. The cross bore registers with a longitudinal bore 85 that opens to the blind chamber 86 to enable the shuttle 81 to move.

Thus, an augmented brake apply system provides increased fluid displacement for initially taking-up compliance in a rapid manner and, by cutting-off augmentation, shifts into a main pressure generation mode for applying maximum braking pressures. The peak augmentation pressure level is tailored to the application and can be modified up to relatively high levels by changing the shuttle face area and the spring load applied to the shuttle.

We claim:

1. A brake apply system comprising:
a modulator having a first bore carrying a power driven dual effect piston that has a base piston surface and an augmentation piston surface;
a wheel brake hydraulically connected to the modulator wherein a continuously open fluid communication route is provided between the wheel brake and the base piston surface, a selectively open fluid communication route is provided alongside the dual effect piston from the augmentation surface to the wheel brake, and
a lip type seal carried on the dual effect piston to serve as a check valve mechanism in the selectively open fluid communication route wherein fluid flow is permitted by the lip type seal through the selectively open fluid communication route from the augmentation surface to the wheel brake.

2. A brake apply system comprising:
a modulator having a first bore carrying a power driven dual effect piston that has a base piston surface and an augmentation piston surface;
a wheel brake hydraulically connected to the modulator wherein a continuously open fluid communication route is provided between the wheel brake and the base piston surface and wherein a selectively open fluid communication route is provided between the wheel brake and the augmentation piston surface with a check valve mechanism positioned in the selectively open fluid communication route;
a fluid reservoir hydraulically connected to the modulator wherein an augmentation chamber is defined adjacent the augmentation surface and wherein the modulator includes a second bore carrying a valve mechanism that provides an open flow path between the augmentation chamber and the fluid reservoir when a wheel brake pressure at the wheel is relatively high and which significantly restricts the flow path when the wheel brake pressure is relatively low;
wherein the valve mechanism includes a shuttle piston that is slidably carried in the second bore wherein the shuttle piston includes a longitudinal bore that extends partly through the shuttle piston and a cross bore that extends completely through the shuttle piston and intersects the longitudinal bore wherein a spring biases the shuttle piston toward a position wherein the cross bore is open to the augmentation chamber and the reservoir.

3. A brake apply system according to claim 2 further comprising a stop positioned in the second bore and including a pin that is extendable into the longitudinal bore.

4. A brake apply system according to claim 3 further comprising a ball that is carried in the longitudinal bore and is engageable with the pin.

5. A brake apply system comprising:
a modulator having a first bore carrying a power driven dual effect piston that has a base piston surface with a main pressure chamber defined adjacent the base piston surface and an augmentation piston surface with an augmentation chamber defined adjacent the augmentation piston surface and having a second bore carrying a shuttle;
a wheel brake hydraulically connected to the modulator wherein a continuously open fluid communication route is provided between the wheel brake and the base piston surface and wherein a selectively open fluid communication route is provided between the wheel brake and the augmentation piston surface with a check valve mechanism positioned in the selectively open fluid communication route;
a fluid reservoir hydraulically connected to the modulator wherein the modulator provides an open flow path between the augmentation chamber and the reservoir through the bore of the shuttle when pressure in the main pressure chamber is relatively high and wherein the flow path is significantly restricted when the pressure in the main pressure chamber is relatively low;

wherein the shuttle is biased by a spring to restrict the open flow path when the brake apply system is at rest; and wherein the open flow path comprises a cross bore in the shuttle and a longitudinal bore in the shuttle that registers with the cross bore.

6. A brake apply system comprising:

a wheel brake;

a fluid reservoir;

a modulator having a first bore carrying a slidable dual effect piston assembly defining a main pressure chamber and an augmentation chamber within the first bore wherein a check valve mechanism is provided between the main pressure chamber and the augmentation chamber so that fluid is transmissible from the augmentation chamber to the main pressure chamber under a first condition and wherein a release opening is provided that allows fluid to communicate from the main pressure chamber to the augmentation chamber under a second condition, where in the dual effect piston assembly is slidable under the operation of a rotatable input shaft to compress the augmentation chamber and the main pressure chamber displacing fluid from the augmentation chamber and the main pressure chamber to the wheel brake and increasing a braking pressure, wherein the modulator includes second bore carrying a shuttle that substantially obstructs flow from the augmentation chamber to the reservoir when the braking pressure is relatively low and permits substantially unobstructed flow from the augmentation chamber to the reservoir when the braking pressure is relatively high and wherein the shuttle moves under the application of the braking pressure on a face of the shuttle; and wherein the shuttle includes a cross bore and a longitudinal bore that registers with the cross bore and wherein the longitudinal bore defines a valve seat and carries a ball that mates with the valve seat to close the augmentation chamber off from the reservoir.

7. A brake apply system according to claim 6 wherein the shuttle includes a slot that cuts across the valve seat providing a continuously open orifice by-pass around the ball between the augmentation chamber and the reservoir.

* * * * *